US012782766B2

(12) United States Patent
Hua et al.

(10) Patent No.: US 12,782,766 B2
(45) Date of Patent: Nov. 3, 2026

(54) DISPLAY MODULE AND DISPLAY DEVICE

(71) Applicant: Shenzhen TCL New Technology co., LTD., Shenzhen (CN)

(72) Inventors: Wei Hua, Shenzhen (CN); Jianbing Su, Shenzhen (CN)

(73) Assignee: Shenzhen TCL New Technology co., LTD., Shenzhen (CN)

( * ) Notice: Subject to any disclaimer, the term of this patent is extended or adjusted under 35 U.S.C. 154(b) by 212 days.

(21) Appl. No.: 18/704,219

(22) PCT Filed: Sep. 22, 2022

(86) PCT No.: PCT/CN2022/120413
§ 371 (c)(1),
(2) Date: Apr. 24, 2024

(87) PCT Pub. No.: WO2023/109237
PCT Pub. Date: Jun. 22, 2023

(65) Prior Publication Data
US 2026/0140409 A1 May 21, 2026

(30) Foreign Application Priority Data
Dec. 14, 2021 (CN) ......................... 202123135630.4

(51) Int. Cl.
*G02F 1/1333* (2006.01)
*G02F 1/1335* (2006.01)

(52) U.S. Cl.
CPC .. *G02F 1/133308* (2013.01); *G02F 1/133504* (2013.01); *G02F 2202/28* (2013.01)

(58) Field of Classification Search
CPC ......... G02F 1/133308; G02F 1/133504; G02F 2202/28

(Continued)

(56) References Cited

U.S. PATENT DOCUMENTS

2008/0136995 A1* 6/2008 Oohira .............. G02F 1/133308 349/58
2012/0140139 A1 6/2012 Zhang et al.
(Continued)

FOREIGN PATENT DOCUMENTS

CN 105003863 10/2015
CN 205787466 12/2016
(Continued)

OTHER PUBLICATIONS

International Search Report and the Written Opinion Dated Dec. 22, 2022 From the International Searching Authority Re. Application No. PCT/CN2022/120413 and its Translation of ISR ito English. (16 Pages).

(Continued)

*Primary Examiner* — David Y Chung

(57) ABSTRACT

A display module includes a film, a liquid crystal module, and a frame. The film includes a first main body portion and first protrusions extending from a first side edge of the first main body portion, with the first protrusions spaced apart. The liquid crystal module includes a liquid crystal screen and a flexible circuit board fixedly connected to the liquid crystal screen. The liquid crystal screen is stacked with the film, and the flexible circuit board is bent from the first side edge. The frame includes a first side wall. A distance disposed between the first protrusion and the first side wall is less than a predetermined distance. An adjacent first protrusion forms a first opening space with the first side wall, and the flexible circuit board penetrates from the first opening space to avoid the flexible circuit board.

16 Claims, 4 Drawing Sheets

(58) Field of Classification Search
USPC .............................................................. 349/58
See application file for complete search history.

(56) References Cited

U.S. PATENT DOCUMENTS

| | | | | |
|---|---|---|---|---|
| 2016/0363803 | A1* | 12/2016 | Kim | G02F 1/133308 |
| 2020/0229076 | A1 | 7/2020 | Jin et al. | |

FOREIGN PATENT DOCUMENTS

| | | |
|---|---|---|
| CN | 107272262 | 10/2017 |
| CN | 107660347 | 2/2018 |
| CN | 108109521 | 6/2018 |
| CN | 109870850 | 6/2019 |
| CN | 214042893 | 8/2021 |
| CN | 215678969 | 1/2022 |
| CN | 216434585 | 5/2022 |
| JP | 2013-37061 | 2/2013 |
| JP | 2020-061350 | 4/2020 |
| WO | WO 2020/032615 | 2/2020 |
| WO | WO 2020/052786 | 3/2020 |

OTHER PUBLICATIONS

Supplementary European Search Report and the European Search Opinion Dated Oct. 22, 2025 From the European Patent Office Re. Application No. 22905990.2. (6 Pages).

Notification of Office Action and Search Report Dated Jun. 16, 2026 from the State Intellectual Property Office of the People's Republic of China Re. Application No. 202180057144.9 and its Translation Into English. (22 Pages).

CMCC "Discussion on Framework of Reduced Capability NR Devices", 3GPP TSG RAN WG1 #101, R1-2003969, e-Meeting May 25-Jun. 5, 2020, 5 P., May 16, 2020.

Ericsson "High-Layer Aspects for RedCap", 3GPP TSG-RAN WG1 Meeting #101-e, R1-2003292, e-Meeting May 25-Jun. 5, 2020, 8 P., May 16, 2020.

Qualcomm Incorporated "Considerations for Standardization Framework and Design Principles of RedCap Devices", 3GPP TSG-RAN WG1 Meeting #101, R1-2004496, e-Meeting May 25-Jun. 5, 2020, 8 P., May 16, 2020.

* cited by examiner

DISPLAY MODULE AND DISPLAY DEVICE

CROSS REFERENCE TO RELATED APPLICATION

This application is a National Phase of PCT Patent Application No. PCT/CN2022/120413 having International filing date of Sep. 22, 2022, which claims the benefit of priority of China Patent Application No. 202123135630.4 filed on Dec. 14, 2021. The contents of the above applications are all incorporated by reference as if fully set forth herein in their entirety.

FIELD OF THE INVENTION

The present disclosure relates to the field of display technology, more particularly, to a display module and a display device.

BACKGROUND

At present, in the display product industry, the design of display products such as televisions or monitors is constantly changing, and the trend of product lightness and narrow frames is a modern aesthetic trend.

In common display devices, the display module usually requires a rubber frame to fix components such as the backboard, film, and light guide plate.

SUMMARY

Technical Problem

The existing display equipment has problems such as complex structure, cumbersome assembly process, multiple components, and low assembly efficiency. Moreover, due to the limitations of the middle frame and rubber frame, it is difficult to meet the design requirements of the narrow frame of the display module, which affects the aesthetic appearance of the display equipment.

Solution to Technical Problem

Technical Solution

One embodiment of the present disclosure is directed to a display module and a display device that can achieve an ultra-narrow lower frame of the display module without the need for rubber frame components, with a simple structure and easy assembly, effectively improving the production efficiency of the display module.

An embodiment of the present disclosure is directed to a display module, comprising:

a film, comprising a first main body portion and a plurality of first protrusions extending from a first side edge of the first main body portion, with the first protrusions spaced apart;

a liquid crystal module, comprising a liquid crystal screen and a flexible circuit board fixedly connected to the liquid crystal screen, wherein the liquid crystal screen is stacked with the film, and the flexible circuit board is bent from the first side edge;

a frame, comprising a first side wall, wherein the first side wall faces the film and the liquid crystal module, and a distance disposed between the first protrusion and the first side wall is less than a predetermined distance;

wherein an adjacent first protrusion forms a first opening space with the first side wall, and the flexible circuit board penetrates from the first opening space to avoid the flexible circuit board.

In some embodiment of the present disclosure, the first protrusion is in contact with the first side wall.

In some embodiment of the present disclosure, the display module further comprises:

a diffusion plate, located on one side of the film away from the liquid crystal screen, which comprising a second main body portion and a plurality of second protrusions extending from a second side edge of the second main body portion, wherein the second side edge is flush with the first side edge, and a distance disposed between the second protrusion and the first side wall is less than a predetermined distance, an adjacent second protrusions form a second opening space with the first side wall, the flexible circuit board protrudes from the second opening space to allow the second protrusion to avoid the flexible circuit board.

In some embodiment of the present disclosure, the second protrusion is in contact with the first side wall.

In some embodiment of the present disclosure, a number of the flexible circuit boards is multiple, and the flexible circuit boards are spaced apart.

In some embodiment of the present disclosure, a first buffer is provided on one side of the film facing the liquid crystal screen, and the film is connected to the liquid crystal screen through the first buffer.

In some embodiment of the present disclosure, the frame comprises a second side wall, wherein a second buffer is provided on the second side wall, and the frame is connected to the liquid crystal screen through the second buffer.

In some embodiment of the present disclosure, a first adhesive layer is provided on one side of the diffusion plate facing the film, and the diffusion plate is fixedly connected to the film through the first adhesive layer.

In some embodiment of the present disclosure, the display module further comprises:

a backboard, fixedly connected to the first side wall, and the flexible circuit board is bent to the side of the backboard away from the diffusion plate.

In some embodiment of the present disclosure, a second adhesive layer is provided on one side of the backboard facing the diffusion plate, and the backboard is fixedly connected to the diffusion plate through the second adhesive layer.

Another embodiment of the present disclosure is directed to a display device. The display device includes a display module. The display module comprises:

a film, comprising a first main body portion and a plurality of first protrusions extending from a first side edge of the first main body portion, with the first protrusions spaced apart;

a liquid crystal module, comprising a liquid crystal screen and a flexible circuit board fixedly connected to the liquid crystal screen, wherein the liquid crystal screen is stacked with the film, and the flexible circuit board is bent from the first side edge;

a frame, comprising a first side wall, wherein the first side wall faces the film and the liquid crystal module, and a distance disposed between the first protrusion and the first side wall is less than a predetermined distance;

wherein an adjacent first protrusion forms a first opening space with the first side wall, and the flexible circuit board penetrates from the first opening space to avoid the flexible circuit board.

According to the display device, the first protrusion is in contact with the first side wall.

According to the display device, the display module further comprises:

a diffusion plate, located on one side of the film away from the liquid crystal screen, which comprising a second main body portion and a plurality of second protrusions extending from a second side edge of the second main body portion, wherein the second side edge is flush with the first side edge, and a distance disposed between the second protrusion and the first side wall is less than a predetermined distance, an adjacent second protrusions form a second opening space with the first side wall, the flexible circuit board protrudes from the second opening space to allow the second protrusion to avoid the flexible circuit board.

According to the display device, the second protrusion is in contact with the first side wall.

According to the display device, a number of the flexible circuit boards is multiple, and the flexible circuit boards are spaced apart.

According to the display device, a first buffer is provided on one side of the film facing the liquid crystal screen, and the film is connected to the liquid crystal screen through the first buffer.

According to the display device, the frame comprises a second side wall, wherein a second buffer is provided on the second side wall, and the frame is connected to the liquid crystal screen through the second buffer.

According to the display device, a first adhesive layer is provided on one side of the diffusion plate facing the film, and the diffusion plate is fixedly connected to the film through the first adhesive layer.

According to the display device, the display module further comprises:

a backboard, fixedly connected to the first side wall, and the flexible circuit board is bent to the side of the backboard away from the diffusion plate.

In some embodiment of the present disclosure, a second adhesive layer is provided on one side of the backboard facing the diffusion plate, and the backboard is fixedly connected to the diffusion plate through the second adhesive layer.

Beneficial Effect of Present Disclosure

Advantageous Effect

The display module and the display device provided in the present embodiment form a first opening space through the adjacent first protrusion of the film and the first side wall of the frame. The flexible circuit board of the liquid crystal module penetrates from the first opening space to avoid the flexible circuit board. Therefore, the compact layout of the liquid crystal module, film, and frame can be achieved, achieving the effect of an ultra-narrow lower frame of the display module without the need for rubber frame components. The structure is simple and easy to assemble, effectively improving the production efficiency of the display module.

BRIEF DESCRIPTION OF THE DRAWINGS

Description of the Drawings

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

In order to understand the application and its beneficial effects more completely, the following illustrations are given below in conjunction with the drawings, where the same icon number indicates the same part in the description below.

Figure 1:
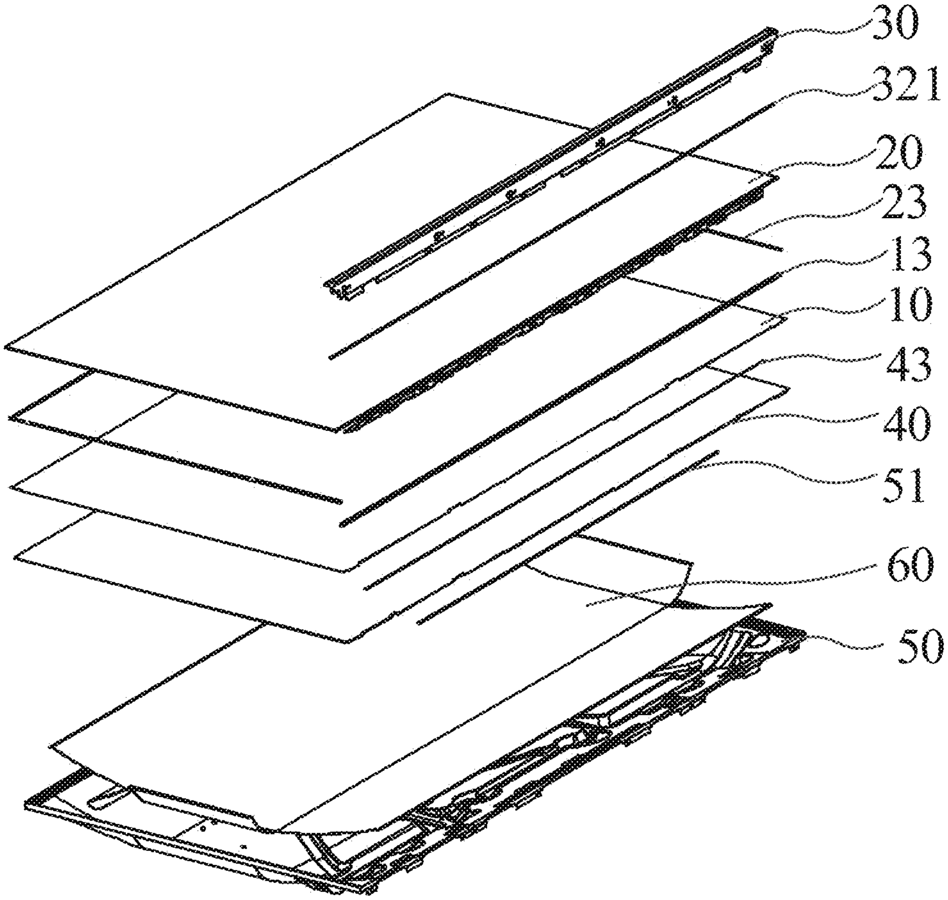

FIG. 1 is a schematic diagram of a structural decomposition of a display module according to one embodiment of the present disclosure.

Figure 2:
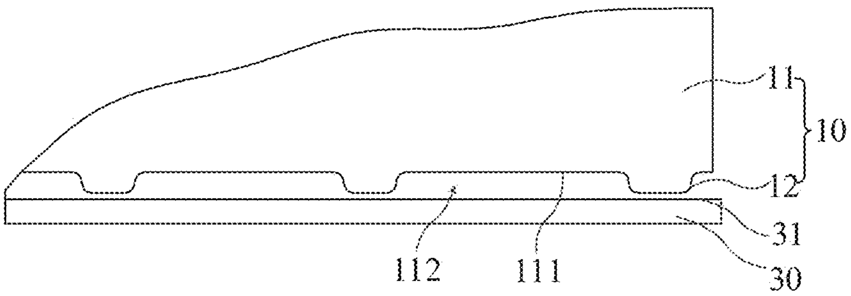

FIG. 2 is a schematic diagram of a structure of a film and a frame shown in FIG. 1.

Figure 3:
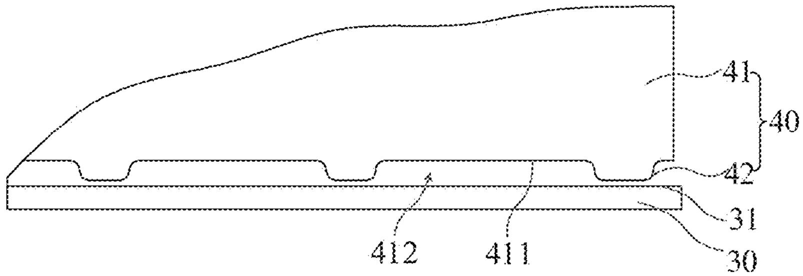

FIG. 3 is a schematic diagram of a structure of a diffusion plate and the frame shown in FIG. 1.

Figure 4:
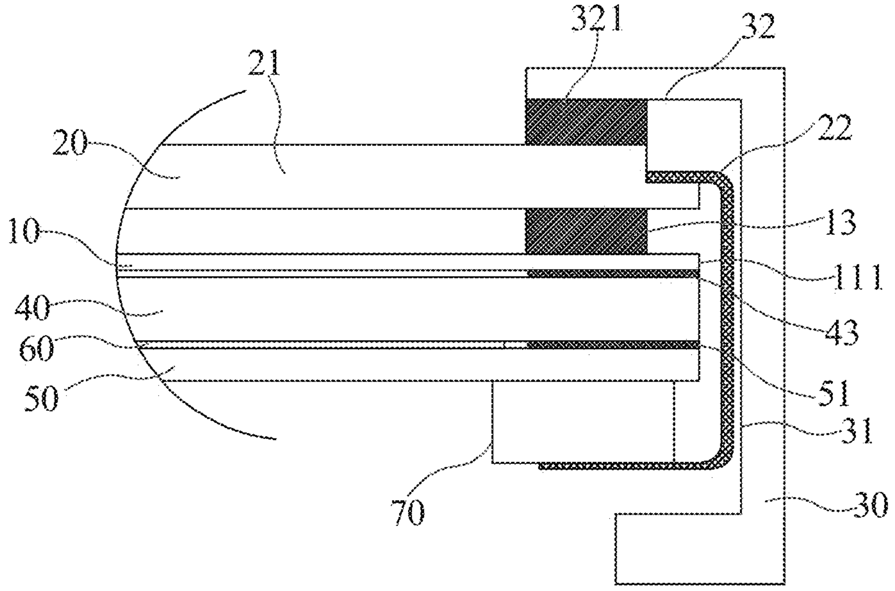

FIG. 4 is a schematic diagram of a structure of the display module according to one embodiment of the present disclosure.

Figure 5:
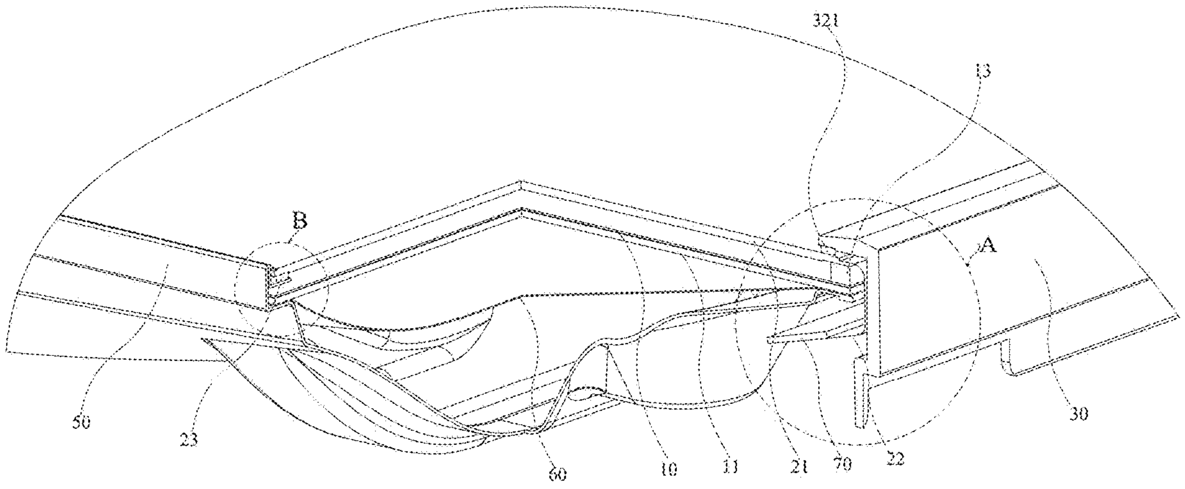

FIG. 5 is a schematic diagram of a structure of the display module from another perspective in FIG. 4.

Figure 6:
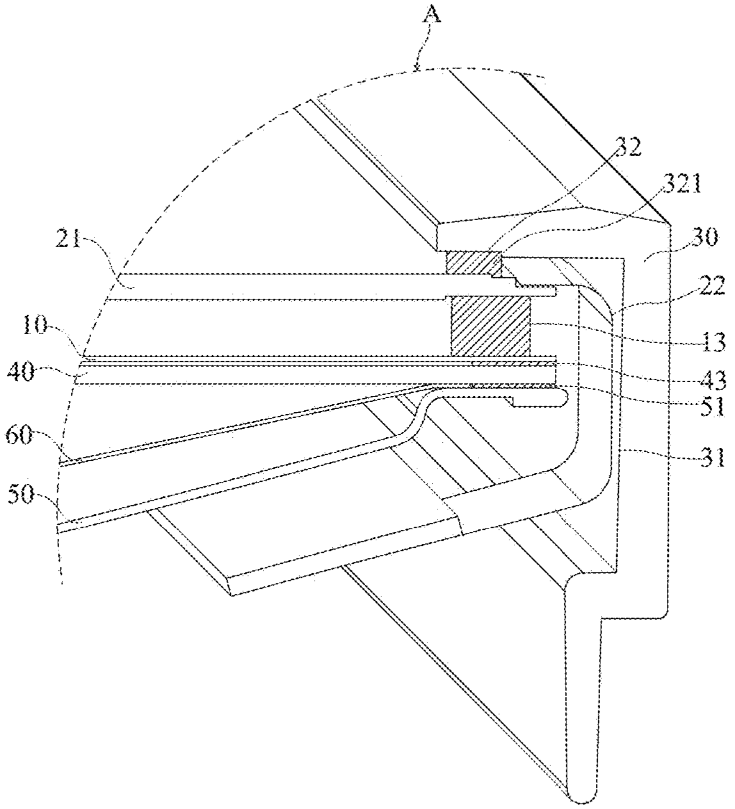

FIG. 6 is a schematic diagram of an enlarged structure of Part A in the display module of FIG. 5.

Figure 7:
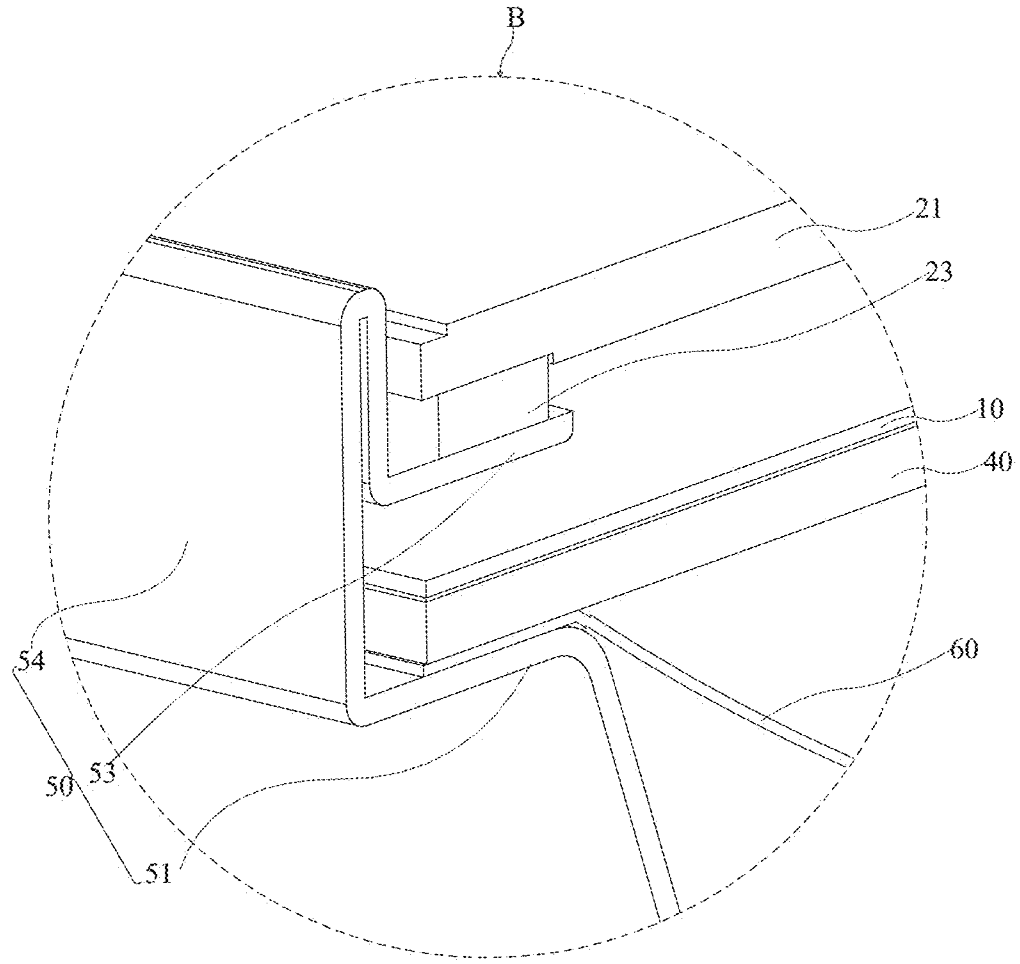

FIG. 7 is a schematic diagram of the enlarged structure of Part B in the display module of FIG. 5.

DESCRIPTION OF THE EMBODIMENTS

The technical solution in the embodiment of the present disclosure will be clearly and completely described below in conjunction with the accompanying drawings in the embodiment of the present disclosure. Obviously, the described embodiments are only some embodiments of the present disclosure, not all embodiments. Based on the embodiments in the present disclosure, all other embodiments obtained by a person skilled in the art without creative labor fall within the scope of protection of the present disclosure.

Embodiments of the present disclosure are directed to a display module and a display device to solve the problems of complex structure, complicated assembly process, multiple components, and low assembly efficiency of the existing display module, which requires a middle frame and a rubber frame to fix the backboard, film, light guide plate, and other components. The following will be explained in conjunction with the attached drawings.

Please refer to FIGS. 1 to 3. FIG. 1 is a schematic diagram of a structural decomposition of a display module according to one embodiment of the present disclosure, FIG. 2 is a schematic diagram of a structure of a film and a frame shown in FIG. 1, and FIG. 3 is a schematic diagram of a structure of a diffusion plate and the frame shown in FIG. 1.

The display module comprises a film 10, a liquid crystal module 20, a diffusion plate 40, and a frame 30. The film 10 is stacked with the diffusion plate 40, and the liquid crystal module 20 is located on the side of the film 10 away from the diffusion plate 40. The frame 30 in the present embodiment is defined as the bottom frame, which is the frame on a ground side, with the ground side facing a sky side.

In practical applications, the film 10 comprises a plurality of layers of optical thin films, such as diffusers, prisms, lenses, etc. The plurality of layers of optical thin films are stacked to form the film 10. In the display module, the film 10 plays a role in unifying light and enhancing brightness.

The film 10 comprises a first main body portion 11 and a plurality of first protrusions 12 extending from a first side

111 of a first main body portion 11, with a plurality of first protrusions 12 spaced apart. The first protrusion portion 12 and the first main body portion 11 are integrally formed structures. The liquid crystal module 20 comprises a liquid crystal screen 21 and a flexible circuit board 22 fixedly connected to the liquid crystal screen 21. One end of the flexible circuit board 22 is bound to the liquid crystal screen 21, and the other end is electrically connected to a main board 70. The flexible circuit board 22 provides circuit connections for the liquid crystal screen 21. The liquid crystal screen 21 is located on one side of the film 10 away from the diffusion plate 40, and is stacked with the film 10. The flexible circuit board 22 is bent from the first side 111 and electrically connected to the main board 70.

The frame 30 comprises a first side wall 31, which faces the film 10 and the liquid crystal screen 21. The distance disposed between the first protrusion 12 and the first side wall 31 is less than the predetermined distance. Among them, the adjacent first protrusion 12 forms a first opening space 112 with the first side wall 31, and the flexible circuit board 22 penetrates from the first opening space 112 to avoid the first protrusion 12 from the flexible circuit board 22, to avoid the first protrusion 12 from pressing against the flexible circuit board 22 and causing poor wiring of the liquid crystal module 20. It should be noted that there is no need to design a rubber frame on the ground side, and a reliability of fixing the film 10 is improved through an auxiliary support of the first protrusion 12.

The predetermined distance disposed between the first protrusion 12 of the film 10 and the first side wall 31 is 2 mm, which means a certain gap is reserved between the first protrusion 12 and the first side wall 31, mainly considering a shape and assembly tolerance of the components. A certain gap is reserved between the first protrusion 12 and the first side wall 31 to avoid structural interference issues during the assembly process of the film 10, the liquid crystal screen 21, and the frame 30.

In some embodiments, the distance disposed between the first protrusion 12 of the film 10 and the first side wall 31 is 1 mm, or the first protrusion 12 of the film 10 is in contact with the first side wall 31, while the adjacent first protrusion 12 and the first side wall 31 can form a first opening space 112. The flexible circuit board 22 is bent from the first side 111 and passes through the first opening space 112 to prevent the first protrusion 12 from colliding with the flexible circuit board 22 and causing poor wiring of the liquid crystal module 20.

The display module also comprises a diffusion plate 40, which is located on the side of the film 10 away from the liquid crystal screen 21, and is fixedly connected to the film 10. The diffusion plate 40 comprises a second main body portion 41 and a plurality of second protrusions 42 extending from the second side edge 411 of the second main body portion 41. The second protrusion portion 42 and the second main body portion 41 are integrally formed structures. Among them, the second side edge 411 is flush with the first side edge 111, and the distance disposed between the second protrusion 42 and the first side wall 31 is less than the predetermined distance. The adjacent second protrusion 42 forms a second opening space 412 with the first side wall 31, and the flexible circuit board 22 passes through the second opening space 412 to avoid the flexible circuit board 22 and prevent the first protrusion 12 from pressing against the flexible circuit board 22 and causing poor wiring of the liquid crystal module 20. It should be noted that due to the absence of a rubber frame on the ground side, the reliability of fixing the film 10 and diffusion plate 40 has been improved through the auxiliary support of the first protrusion 12 and the second protrusion 42.

The predetermined distance disposed between the second protrusion 42 of the diffusion plate 40 and the first side wall 31 is 2 mm, which means a certain gap is reserved between the second protrusion 42 and the first side wall 31, mainly considering the shape and assembly tolerance of the components. A certain gap is reserved between the second protrusion 42 and the first side wall 31 to avoid structural interference issues during the assembly process of the diffusion plate 40, liquid crystal screen 21, and frame 30.

The distance disposed between the second protrusion 42 of diffusion plate 40 and the first side wall 31 is 1 mm, or the second protrusion 42 of diffusion plate 40 is in contact with the first side wall 31. The second side edge 411 is flush with the first side edge 111, while the adjacent second protrusion 42 and the first side wall 31 can form a second opening space 412. The second opening space 412 is in an upward and downward conductive state with the first opening space 112. The flexible circuit board 22 can penetrate from the first opening space 112 and the second opening space 412 to avoid the first protrusion 12 and the second protrusion 42 from pressing against the flexible circuit board 22 and causing poor wiring of the liquid crystal module 20. Meanwhile, by providing auxiliary support from the first protrusion 12 and the second protrusion 42, the reliability of fixing the film 10 and diffusion plate 40 is improved.

The second protrusion 42 of the diffusion plate 40 and the first protrusion 12 of the film 10 are arranged in the same shape. When the second side edge 411 is flush with the first side edge 111, the second protrusion 42 is also flush with the first protrusion 12. The first opening space 112 and the second opening space 412 are in an upward and downward conductive state. The flexible circuit board 22 can penetrate from the first opening space 112 and the second opening space 412.

According to the size of the liquid crystal module 20, the number of flexible circuit boards 22 can be set to multiple, and the width and number of flexible circuit boards 22 match the first opening space 112 and the second opening space 412, so that the flexible circuit board 22 can pass through the first opening space 112 and the second opening space 412, and improve the reliability of fixing the flexible circuit board 22. For example, the liquid crystal module 20 can have 12 flexible circuit boards 22, which are led out from one end of the liquid crystal screen 21. The 12 flexible circuit boards 22 are bent from the first side 111 and electrically connected to the main board 70 through the first opening space 112 and the second opening space 412.

Please refer to FIGS. 1 to 4, which is a schematic diagram of a structure of the display module according to one embodiment of the present disclosure. On one side of the film 10 facing the liquid crystal screen 21, a first buffer 13 is provided, and the film 10 is connected to the liquid crystal screen 21 through the first buffer 13. The frame 30 also comprises a second side wall 32, which is vertically arranged with the first side wall 31. A second buffer member 321 is provided on the second side wall 32, and the frame 30 is connected to the liquid crystal screen 21 through the second buffer member 321. Due to the buffering effect between the first buffer 13 and the second buffer, it can buffer collisions and impacts caused by external forces, providing protection for the liquid crystal screen 21 and to avoid damage from external forces.

A material of the first buffer 13 and a material of the second buffer 321 can be elastic materials such as foam and rubber. The materials of the first buffer 13 and the second buffer 321 can be the same or different.

In some embodiments, a first adhesive layer 43 is provided on one side of the diffusion plate 40 facing the film 10, and the diffusion plate 40 is fixedly connected to the film 10 through the first adhesive layer 43. The first adhesive layer 43 can be adhesive materials such as double-sided adhesive or pressure-sensitive adhesive. By using the first adhesive layer 43, the diffusion plate 40 and the film 10 are bonded and fixed, and the film 10 is firmly adhered to the diffusion plate 40 to avoid separation between the film 10 and the diffusion plate 40. Compared to the existing assembly method of hanging ears between film 10 and diffusion plate 40, the adhesive fixation method between diffusion plate 40 and film 10 is simpler, more convenient, and more reliable.

Please refer to FIGS. 5 to 7. FIG. 5 is a schematic diagram of a structure of the display module from another perspective in FIG. 4, FIG. 6 is a schematic diagram of an enlarged structure of Part A in the display module of FIG. 5, and FIG. 7 is a schematic diagram of the enlarged structure of Part B in the display module of FIG. 5.

The display module also comprises a backboard 50, which is fixedly connected to the frame 30. For example, the backboard 50 is connected to the frame 30 by fixing screws, and the backboard 50 is in contact with the first side wall 31. The flexible circuit board 22 is bent to the side of the backboard 50 away from the diffusion plate 40 and electrically connected to the main board 70.

The left, right, and sky sides of the backboard 50 are integrated bending structures. The backboard 50 comprises a bottom plate 54 and a side plate 52 connected to the edge of the bottom plate 54. The side plate 52 is integrated bending to form a support portion 53, which is the bearing surface of the liquid crystal screen 21. By designing an integrated bent backboard 50, the display module can achieve a frameless effect without the need for middle or rubber frame components, with a simple structure that effectively reduces the cost of the display module. On the left, right, and sky sides, the liquid crystal screen 21 is fixed to the support portion 53 through a screen sealing adhesive, which is set on the upper surface of the support portion 53 and fixedly connected to the liquid crystal screen 21. The liquid crystal screen 21 is fixed to the support portion 53 of the backboard 50 using screen sealing adhesive, which has a simple structure, convenient operation, and is conducive to achieving the ultra-narrow frame 30 or frameless effect of the display module.

Please refer to FIG. 5, where the bottom plate 54, the side plate 52, and the support portion 53 surround the accommodating space. On the left, right, and sky sides of the display module, the diffusion plate 40 and the film 10 are located within the accommodating space, and the film 10 and the diffusion plate 40 are fixed. By designing a backboard 50 with an integrated bending structure, there is no need for middle frame and rubber frame components, which is conducive to achieving a frameless effect of the display module, reducing components, and facilitating assembly.

On one side of the backboard 50 facing the diffusion plate 40, a second adhesive layer 51 is provided, and the backboard 50 is fixedly connected to the diffusion plate 40 through the second adhesive layer 51. The second adhesive layer 51 can be adhesive materials such as double-sided adhesive or pressure-sensitive adhesive. The material of the second adhesive layer 51 can be the same as the first adhesive layer or different from the first adhesive layer 43. The diffusion plate 40 can be firmly fixed to the back plate 50 through the second adhesive layer 51, improving the structural stability.

In the present embodiment of the present disclosure, a reflective sheet 60 is further provided between the backboard 50 and the diffusion plate 40. The reflective sheet 60 is attached to the upper surface of the backboard 50, and the reflective sheet reflects the light source that enters the backboard 50 into the diffusion plate 40, thereby improving the utilization efficiency of light.

One embodiment of the present disclosure is also directed to a display device, which can be a liquid crystal display (LCD) TV, a display, etc. The display device comprises the above-mentioned display module. Because the display device adopts all the technical solutions of all the above embodiments, it has at least all the beneficial effects brought about by the technical solutions of the above embodiments, and will not be repeated herein.

The embodiment of the application provides a display module and a display device, through the adjacent first protrusion of the film and the first side wall of the frame to form a first opening space, the flexible circuit board of the liquid crystal module penetrates from the first opening space, so that the first protruding part avoids the flexible circuit board, so that the compact layout of the liquid crystal module, the film and the frame can be realized, the effect of the ultra-narrow lower frame of the display module is achieved, and the plastic frame parts are not required, the structure is simple, the assembly is easy, and the production efficiency of the display module is effectively improved.

In the above embodiments, the descriptions of each embodiment have their own emphasis, and the part that is not detailed in a certain embodiment may be referred to the relevant descriptions of other embodiments.

In the description of the present disclosure, the terms "first" and "second" are used for descriptive purposes only and should not be construed as indicating or implying relative importance or implying the number of technical features indicated. Thus, defining the "first" and "second" features may explicitly or implicitly include one or more features.

The above is a detailed introduction to the display module and display equipment provided by the embodiment of the present disclosure, the principle and embodiment of the present disclosure are elaborated in this paper, and the description of the above embodiment is only used to help understand the method of the present disclosure and its core idea; at the same time, for those skilled in the art, according to the idea of the present disclosure, there will be changes in the specific embodiment and the scope of the present disclosure, and in summary, the content of the specification should not be understood as a restriction on the present disclosure.

What is claimed is:

1. A display module, comprising:

a film, comprising a first main body portion and a plurality of first protrusions extending from a first side edge of the first main body portion, with the first protrusions spaced apart;

a liquid crystal module, comprising a liquid crystal screen and a flexible circuit board fixedly connected to the liquid crystal screen, wherein the liquid crystal screen is stacked with the film, and the flexible circuit board is bent from the first side edge; and a frame, comprising a first side wall, wherein the first side wall faces the film and the liquid crystal module, and a distance disposed between the first protrusion and the first side wall is less than a predetermined distance;

a diffusion plate, located on one side of the film away from the liquid crystal screen, which comprising a second main body portion and a plurality of second protrusions extending from a second side edge of the second main body portion, wherein the second side edge is flush with the first side edge, and a distance disposed between the second protrusion and the first side wall is less than a predetermined distance, adjacent second protrusions form a second opening space with the first side wall, the flexible circuit board protrudes from the second opening space to avoid the first protrusion, wherein adjacent first protrusions form a first opening space with the first side wall, and the flexible circuit board protrudes from the first opening space to avoid the first protrusion, wherein the second protrusion is in contact with the first side wall.

2. The display module as claimed in claim 1, wherein the first protrusion is in contact with the first side wall.

3. The display module as claimed in claim 1, wherein a number of the flexible circuit boards is multiple, and the flexible circuit boards are spaced apart.

4. The display module as claimed in claim 1, wherein a first buffer is provided on one side of the film facing the liquid crystal screen, and the film is connected to the liquid crystal screen through the first buffer.

5. The display module as claimed in claim 1, wherein the frame comprises a second side wall, wherein a second buffer is provided on the second side wall, and the frame is connected to the liquid crystal screen through the second buffer.

6. The display module as claimed in claim 1, wherein a first adhesive layer is provided on one side of the diffusion plate facing the film, and the diffusion plate is fixedly connected to the film through the first adhesive layer.

7. The display module as claimed in claim 1, further comprising:

a backboard, fixedly connected to the first side wall, and the flexible circuit board is bent to the side of the backboard away from the diffusion plate.

8. The display module as claimed in claim 7, wherein a second adhesive layer is provided on one side of the backboard facing the diffusion plate, and the backboard is fixedly connected to the diffusion plate through the second adhesive layer.

9. A display device comprising a display module, the display module comprising:

a film, comprising a first main body portion and a plurality of first protrusions extending from a first side edge of the first main body portion, with the first protrusions spaced apart;

a liquid crystal module, comprising a liquid crystal screen and a flexible circuit board fixedly connected to the liquid crystal screen, wherein the liquid crystal screen is stacked with the film, and the flexible circuit board is bent from the first side edge; and a frame, comprising a first side wall, wherein the first side wall faces the film and the liquid crystal module, and a distance disposed between the first protrusion and the first side wall is less than a predetermined distance;

a diffusion plate, located on one side of the film away from the liquid crystal screen, which comprising a second main body portion and a plurality of second protrusions extending from a second side edge of the second main body portion, wherein the second side edge is flush with the first side edge, and a distance disposed between the second protrusion and the first side wall is less than a predetermined distance, adjacent second protrusions form a second opening space with the first side wall, the flexible circuit board protrudes from the second opening space to avoid the first protrusion;

wherein adjacent first protrusions form a first opening space with the first side wall, and the flexible circuit board protrudes from the first opening space to avoid the first protrusion, wherein the second protrusion is in contact with the first side wall.

10. The display device as claimed in claim 9, wherein the first protrusion is in contact with the first side wall.

11. The display device as claimed in claim 9, wherein a number of the flexible circuit boards is multiple, and the flexible circuit boards are spaced apart.

12. The display device as claimed in claim 9, wherein a first buffer is provided on one side of the film facing the liquid crystal screen, and the film is connected to the liquid crystal screen through the first buffer.

13. The display device as claimed in claim 9, wherein the frame comprises a second side wall, wherein a second buffer is provided on the second side wall, and the frame is connected to the liquid crystal screen through the second buffer.

14. The display device as claimed in claim 9, wherein a first adhesive layer is provided on one side of the diffusion plate facing the film, and the diffusion plate is fixedly connected to the film through the first adhesive layer.

15. The display device as claimed in claim 9, wherein the display module further comprises:

a backboard, fixedly connected to the first side wall, and the flexible circuit board is bent to the side of the backboard away from the diffusion plate.

16. The display device as claimed in claim 15, wherein a second adhesive layer is provided on one side of the backboard facing the diffusion plate, and the backboard is fixedly connected to the diffusion plate through the second adhesive layer.

* * * * *